United States Patent
Pappas et al.

(10) Patent No.: US 6,835,068 B2
(45) Date of Patent: Dec. 28, 2004

(54) APPARATUS FOR AIRCRAFT SEAT CONNECTOR INTERFACE TO PORTABLE ELECTRONIC DEVICES

(75) Inventors: Drew A. Pappas, Yorba Linda, CA (US); Andrew A. Thompson, Seattle, WA (US); Scott C. Sanner, Kent, WA (US); Stephen J. Moritz, Huntington Beach, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 09/955,919

(22) Filed: Sep. 19, 2001

(65) Prior Publication Data

US 2003/0054686 A1 Mar. 20, 2003

(51) Int. Cl.$^7$ .............................................. H01R 33/00
(52) U.S. Cl. ....................................................... 439/34
(58) Field of Search .......................... 439/34, 503, 535

(56) References Cited

U.S. PATENT DOCUMENTS

| | | | |
|---|---|---|---|
| 5,570,002 A | | 10/1996 | Castleman |
| 5,590,022 A | * | 12/1996 | Harvey ........................ 361/683 |
| 6,038,426 A | * | 3/2000 | Williams, Jr. ................. 725/77 |
| 6,046,571 A | * | 4/2000 | Bovio et al. ................. 320/107 |
| 6,135,549 A | * | 10/2000 | Demick et al. ............... 108/44 |
| 6,206,480 B1 | * | 3/2001 | Thompson .................. 361/625 |
| 6,315,618 B1 | * | 11/2001 | Francis ........................ 361/686 |
| 6,626,275 B2 | * | 9/2003 | Lee ........................... 191/12 R |
| 6,637,166 B2 | * | 10/2003 | Kinsey ....................... 52/220.8 |
| 2002/0016086 A1 | | 2/2002 | Kinsey |

FOREIGN PATENT DOCUMENTS

| | | |
|---|---|---|
| DE | 100 03 656 A | 7/2001 |
| FR | 2 764 850 A | 12/1998 |

OTHER PUBLICATIONS

The American Heritage Dictionary of the English Language, Third Edition copyright 1992 by Houghton Mifflin Company. Electronic version licensed from INSO Corporation.*

Marsha Walton, "Airline travelers to go online while en route", Jan. 23, 2001, CNN.com, http://europe.cnn.com/2001/TECH/computing/01/23/inlight1.internet/.*

WO 00/14987, Publication date Mar. 16, 2000.*

"ARINC Series, ARINC 628 In–Seat Power Connector", http://www.hypertronics.com/catalog2001/a_series/index.html, 1 page, plus 2 additional pages of a PDF file linked from page, Jul. 10, 2001.

(List continued on next page.)

*Primary Examiner*—P. Austin Bradley
*Assistant Examiner*—James R. Harvey
(74) *Attorney, Agent, or Firm*—Harness Dickey & Pierce P.L.C.

(57) ABSTRACT

A connector module for connecting a portable electronic device to a power source and a network on-board a mobile platform, for example an aircraft. The connector module is adapted to be integrated into an interior compartment of the aircraft, either adjacent to or disposed within a seat of the aircraft. The connector module provides a networking port disposed within a housing that is adapted to couple the portable electronic device to the aircraft network. A power port is also disposed within the housing of the connector module and is adapted to receive a DC power cable of the portable electronic device for providing power to the portable electronic device. Several embodiments of the connector module provide various configurations for integrating the connector module into the compartment of the aircraft and/or into the seat of the aircraft.

9 Claims, 4 Drawing Sheets

OTHER PUBLICATIONS

"The SmartAdapter, FAQ's—Frequently Asked Questions," http://www.nescobatteries.com/safaq.html, 5 pages, Aug. 26, 2000.

"The SmartAdapter; Operating & Setup Instructions," http://www.nescobatteries.com/safinstructions.html, 1 page, Jun. 26, 2000.

"One Power Adapter Does It All, The SmartAdapter," http://www.nescobatteries.com/safrontpage.html, 1 page, Jun. 20, 2000.

"The SmartAdapter+, Technical Specifications," http://www.nescobatteries.com/saspecifications.html, 1 page, Jun. 26, 2000.

"The SmartAdapter, Features & Benefits," http://www.nescobatteries.com/safeatures.html, 1 page, Jun. 26, 2000.

Cigarette Lighter Power Splitter 3, Communications Electronics, Inc., http://www.usascan.com/files/pc3.html, 1 page from on–line catalog, Copyright 1996–2001.

* cited by examiner

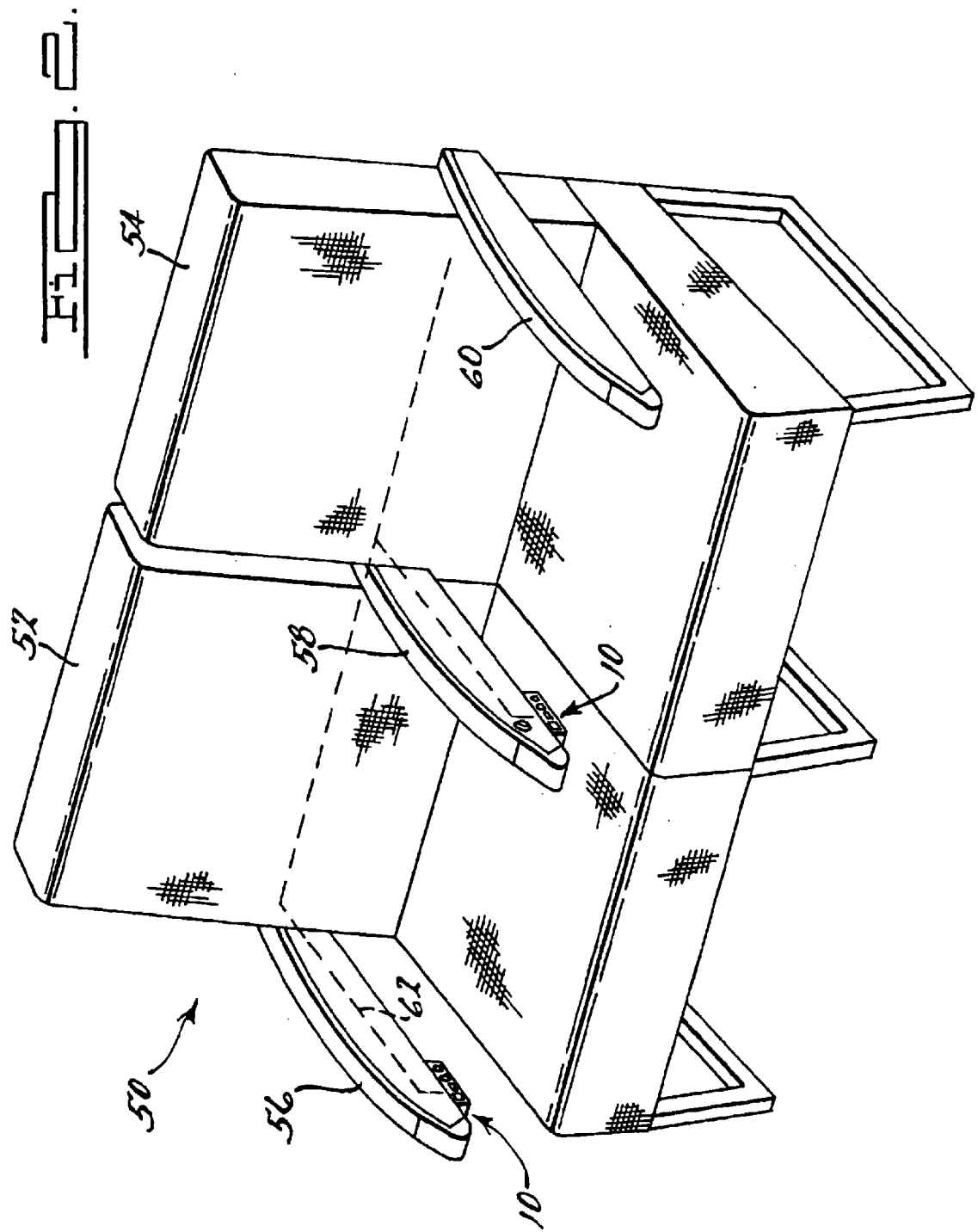

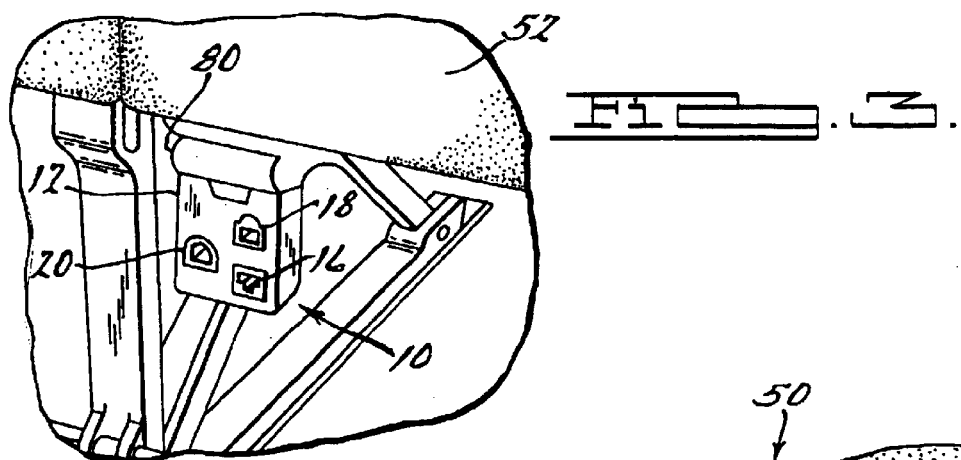
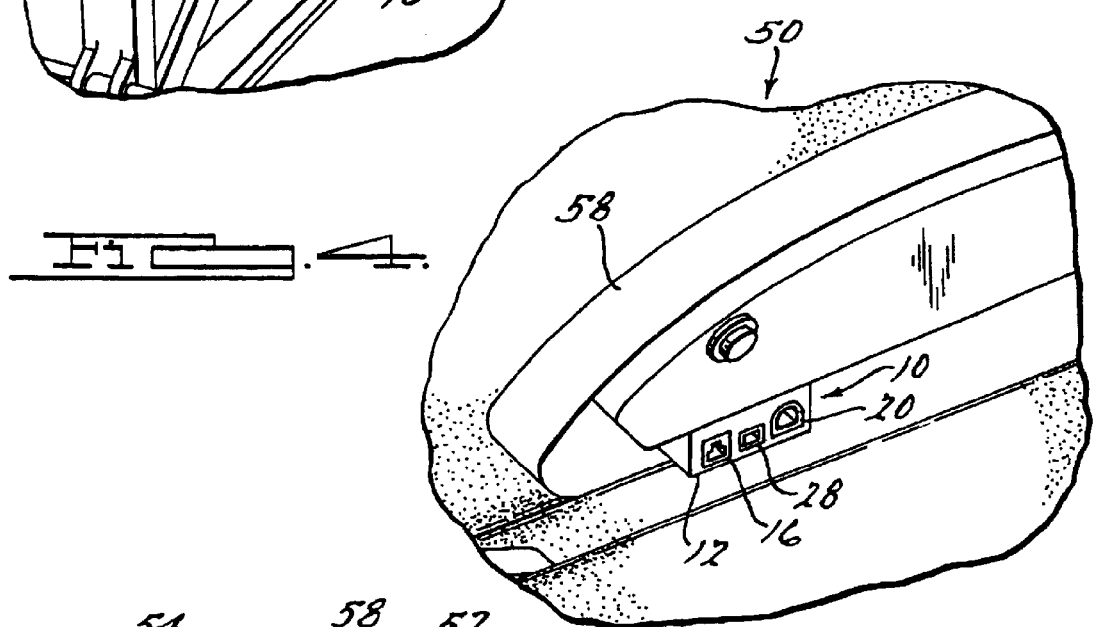
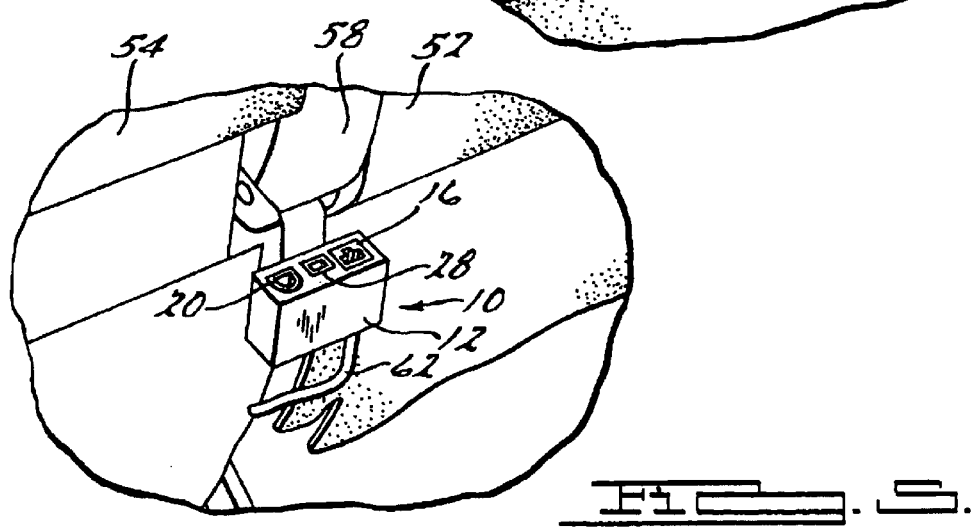

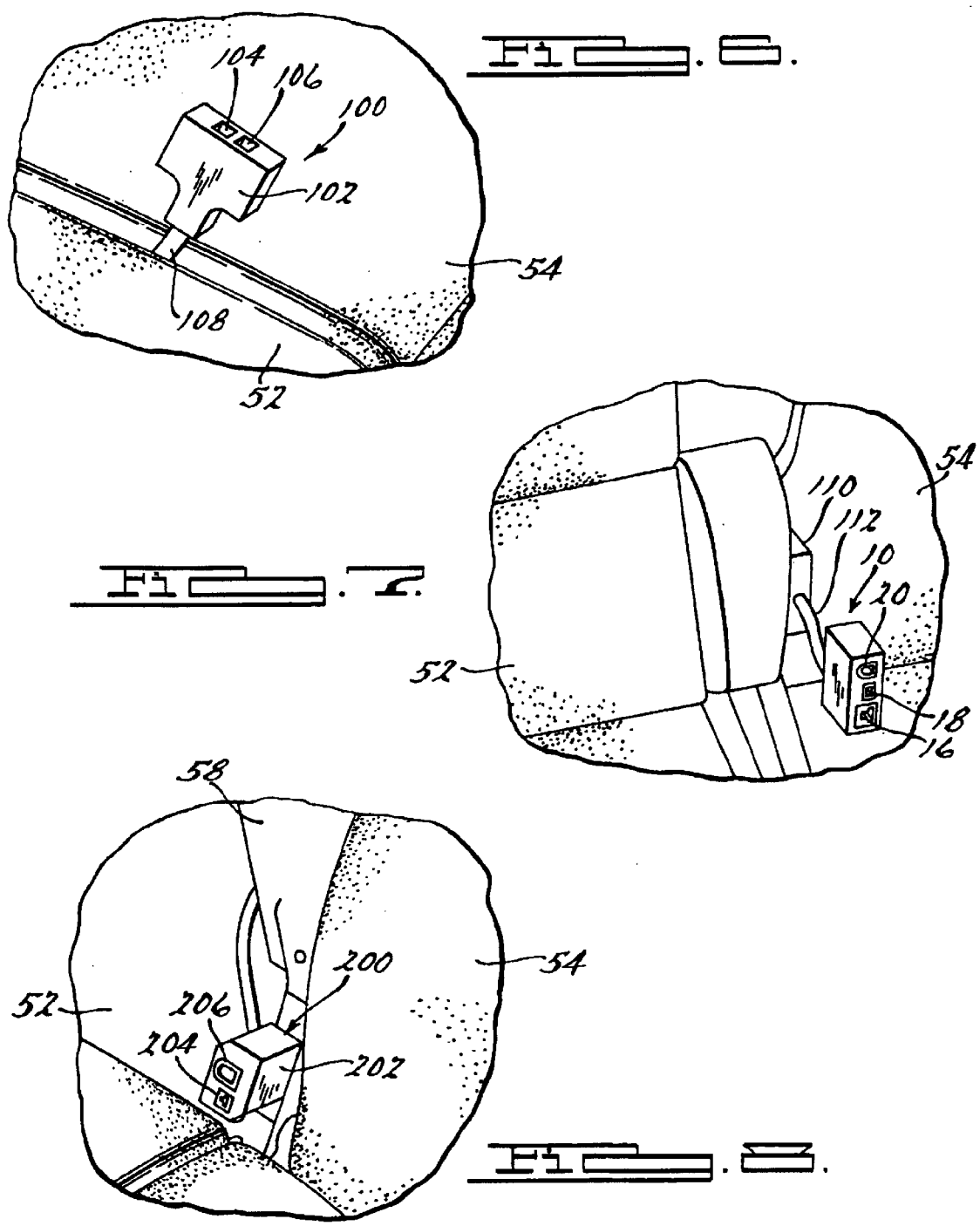

APPARATUS FOR AIRCRAFT SEAT CONNECTOR INTERFACE TO PORTABLE ELECTRONIC DEVICES

FIELD OF THE INVENTION

The present invention relates generally to interfaces for electronic devices and specifically to an aircraft seat connector interface for portable electronic devices.

BACKGROUND OF THE INVENTION

Airline passengers frequently bring on-board an aircraft their portable electronic devices including laptop computers, hand-held computers and cellular telephones or pagers with Internet access capability. These various electronic devices can be used by passengers to perform a wide variety of computing operations including reviewing web pages, gathering information, creating documents and performing other work or leisure related activities. These devices are convenient for use during a commercial air flight where several hours can pass between destinations. Due to the proliferation of electronic devices, systems have developed to integrate their use in areas where they have not been fully utilized, such as on commercial aircraft.

For commercial aircraft, greater utilization has developed by first integrating a network in the commercial aircraft to allow for connecting the computerized devices to the network in order to access additional services. An example of an aircraft based network is "Connexion By Boeing™". Connexion By Boeing™ is a consumer and commercial airline service that offers high-speed data communication services through a space-based network. The system offers air travelers high-speed intranet, email, and Internet services while in-flight. To use these services, a passenger connects their electronic device to a network on the aircraft that in turn places the user's electronic device in communication, via a space based communication link, with a ground based component of the system.

Electronic devices, however, require power for operation and connectivity to a network in order to access additional services or resources such as the Connexion By Boeing™ system. While many portable electronic devices come with battery power as an optional power source, batteries have a limited charge life span that may be shorter than some commercial flights.

Network connectivity also poses problems in how it is implemented. For example, not all network connectivity solutions conform with Federal Aviation Association (FAA) requirements for use on-board a commercial aircraft. Therefore, there is a need for a system which allows passengers and crew members who bring an electronic device on-board commercial aircraft to easily connect their electronic device to a power source and/or to a network located on the aircraft.

It is therefore an object of this invention to provide a system for connecting electronic devices to a power source and to a network on an aircraft. It is a further object to provide a system that is convenient and practical for use in an on-board commercial aircraft environment. An additional object is to allow for connectivity of electronic devices with differing power and network connection capability or requirements.

SUMMARY OF THE INVENTION

According to the invention, there is provided a connector module in accordance with a preferred embodiment for connecting an electronic device to a power source and a network. The connector module is integrated into an interior compartment of the aircraft and may be adjacent to or disposed within a seat of the aircraft. The connector module comprises a housing with a networking port and a power port disposed within the housing. The networking port is of the type that can connect an electronic device to a network for providing network connectivity of the electronic device. The power port is of the type that will receive a power cable attached to the electronic device for providing power to the electronic device. Several preferred embodiments of the invention are disclosed which reflect differing placements and configurations of the connector module.

In a preferred embodiment, the housing of the connectivity module is attached to the underside of the seat. The lower half of the connectivity module tilts forward and up to allow for connection with the electronic device. In another preferred embodiment, the connector module is connected to an armrest of the seat. In another preferred embodiment, the connector module is located on the back of the seat in front of the passenger that would use the connector module. In another preferred embodiment, the connector module is disposed on a flexible tube or pipe that can be articulated up from between two seats. In another preferred embodiment, the connector module is attached to a retractable module secured to the back of a seat in front of the passenger that will use the connector module. Alternatively, the connector module is located under the seat pan on which the passenger is seated that will use the connector module. In another preferred embodiment, the connector module is located below an armrest and between two adjacent seats.

The connector module provides easy and convenient connectivity for most electronic devices. It accomplishes this by providing connectivity to a network via both an RJ-45 jack and a universal serial bus (USB) port. The connector module also offers one or two power connectivity options including a 15 volt DC half inch connector (a.k.a. cigarette lighter connector) or a ARINC 628 connector.

In operation, a passenger or crew member brings their electronic device, for example, a laptop computer, on-board an aircraft. The laptop computer is connected to the connector module by connecting a cable from a networking port on the laptop computer to either the universal serial bus (USB) or RJ-45 jack of the connector module. The laptop computer may also be connected to the power source by connecting a cable from the laptop computer power port to the power port of the connector module. When connected, the laptop computer has access to the on-board aircraft network and to a DC power source.

BRIEF DESCRIPTION OF THE DRAWINGS

The present invention will become more fully understood from the detailed description and the accompanying drawings, wherein:

FIG. 2 is a perspective view of the connection module of FIG. 1 disposed in the armrests of two exemplary seats of an aircraft;

FIG. 3 is a perspective view of a preferred embodiment of the connector module of FIG. 1 disposed in the rear underside of one of the seats illustrated in FIG. 2;

FIG. 4 is a perspective view of the aircraft seat of FIG. 2 with a preferred embodiment of the connector module disposed within the armrest of the seats;

FIG. 5 is a perspective view of the back of one of the seats of FIG. 2 with a preferred embodiment of the connector module connected to the seat back;

FIG. 6 is a perspective view of the front cushions of the seats in FIG. 2 with a preferred embodiment of the connector module of FIG. 1 disposed between the two seat cushions;

FIG. 7 is a perspective view of the aft side of the seats of FIG. 2 with a preferred embodiment of the connector module disposed therein; and FIG. 8 is a perspective view of the seats of FIG. 2 with a preferred embodiment of the connector module between the two seats underneath the middle armrest.

DETAILED DESCRIPTION OF THE PREFERRED EMBODIMENTS

Figure 1:
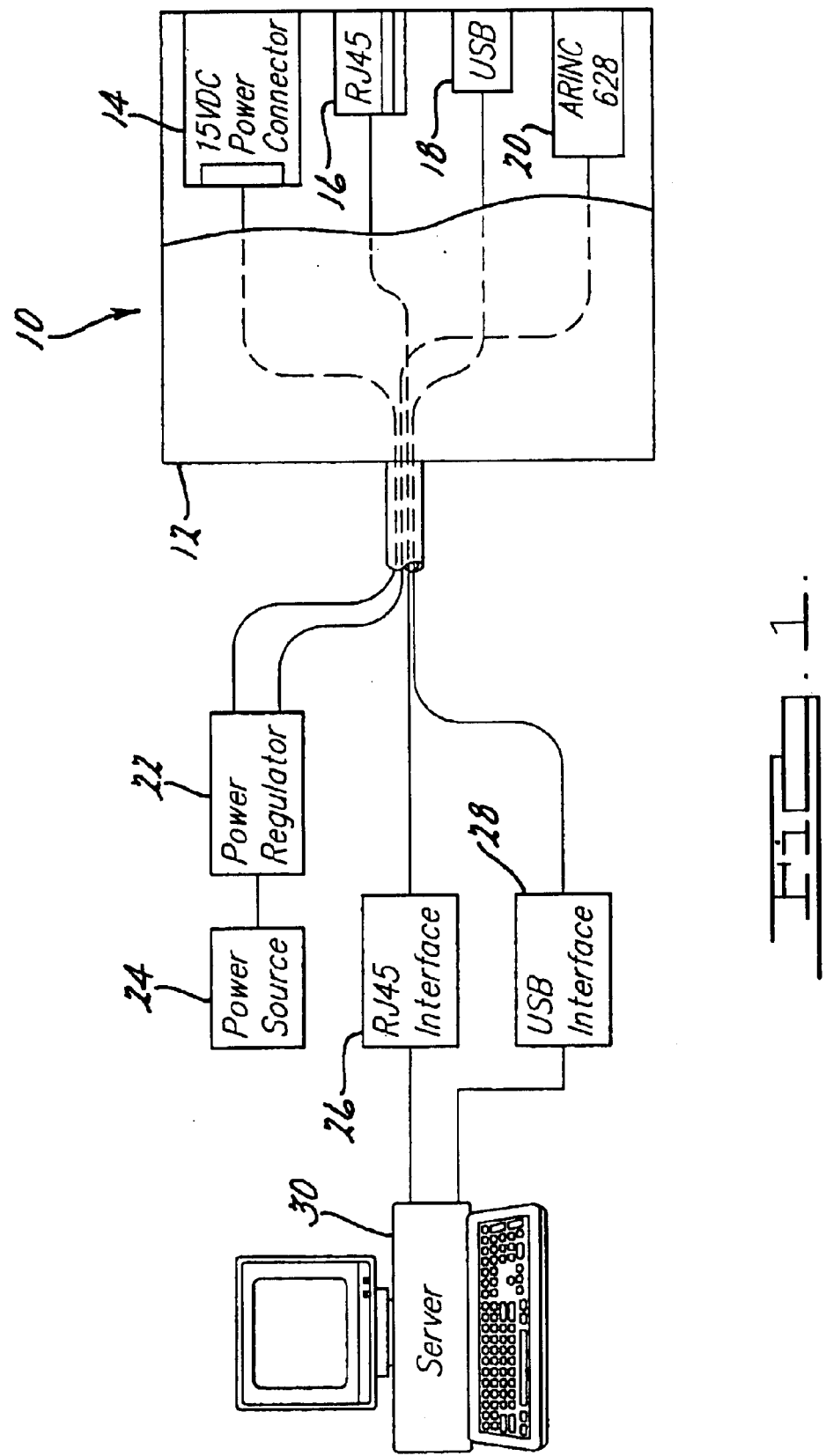
FIG. 1 is a simplified block diagram illustrating the connector module of the present invention in communication with an on-board server located on a mobile platform such as an aircraft.

The following description of the preferred embodiment(s) is merely exemplary in nature and is in no way intended to limit the invention, its application, or uses.

In FIG. 1, a connector module 10 in accordance with a preferred embodiment of the present invention is shown. The connector module 10 comprises a housing 12 and a plurality of network and power connectors. The connector module 10 is illustrated with a 15 volt DC power connector 14, an RJ-45 network connector 16, a universal serial bus connector (USB) 18, and an ARINC 628 power connector 20 disposed within the housing 12. The 15 volt DC power connector 14 (a.k.a. a cigarette lighter connector) is a female connector suitable for receiving a male 15 volt DC power connector attached by cabling to an electronic device. The RJ-45 interface 26 is a female receptacle suitable for connecting to a male RJ-45 connector attached by cabling to the electronic device. The USB interface 28 is a female interface suitable for receiving a male USB interface connector attached by cabling to the electronic device. The ARINC 628 power connector 20 is a female connector suitable for receiving a corresponding male ARINC 628 connector attached by cabling to the electronic device.

Both the 15 volt DC power connector 14 and the ARINC 628 power connector 20 are connected to a power regulator 22 for providing suitable power to each power connector. The power regulator 22 is connected to a power source 24. The power source 24 provides power to the 15 volt DC connector 14 and the ARINC 626 power connector 20, that in turn provide power to the electronic device.

The RJ-45 connector 16 is connected to an RJ-45 interface 26. The RJ-45 interface 26 is connected to an on-board server 30 located on the mobile platform, in this example an aircraft, for providing network connectivity to any electronic device attached to the connector module 10. Similarly, the USB connector 18 is connected to a USB interface 28. The USB interface is connected to the server 30. Thus, the USB connector 18 also provides network connectivity for an electronic device.

Referring to FIG. 2, the connector module 10 is shown disposed within an aircraft seat assembly 50. The aircraft seat assembly 50 is illustrated as having a first seat 52 and second seat 54 with a first armrest 56, a second (middle) armrest 58, and a third armrest 60. Separate connector modules 10 are disposed within each of the first armrest 56 and second (middle) armrest 58. This allows passengers to sit in both the first seat 52 and second seat 54 and connect their electronic devices to their associated connector module 10. Cabling 62 connects the connector module 10 in the first armrest 56 and the connector module 10 in the second (middle) armrest 58 to the power source 24 and to the server 30.

Now referring to FIG. 3, the first embodiment of the connector module 10 is shown attached to the bottom aft portion of a seat such as the first seat 52. The connector module 10 and the housing 12 are pivotably attached to a pivot base 80 for allowing the connector module to be rotated forward to aid in connecting the connector module to the electronic device. In the first preferred embodiment, the connector module 10 has the USB connector 18, the RJ-45 network connector 16, and the ARINC 628 power connector 20 disposed within the housing 12.

Referring to FIG. 4, the connector module 10 is illustrated attached to an armrest such as the second (middle) armrest 58 of the aircraft seat assembly 50.

Referring to FIG. 5, the connector module 10 is shown supported on the aft side and middle of the first seat 52 and the second seat 54.

Now referring to FIG. 6, an alternative preferred embodiment 100 of the invention is shown which only includes a housing 102, RJ-45 connector 104 and a power connector 106. The connector module 100 is attached to a cable 108 and disposed between the first seat 52 and second seat 54. With this embodiment, the connector module 100 can advantageously be rotated up from between the first seat 52 and the second seat 54 for connecting to the electronic device before being placed back between the seat cushions while connected.

Now referring to FIG. 7, the connector module 10 is shown disposed on the aft side of the second (middle) armrest 58. In this embodiment, the connector module 10 is connected to a base housing 110 that is connected to the second (middle) armrest 58. The base housing 110 is connected to the connector module by a connector cable 112. In a variation on this embodiment, the base housing 110 may contain a retraction mechanism for allowing the connector cable 112 to be retracted into the base housing 110.

Now referring to FIG. 8, another preferred embodiment of the invention illustrates a connector module 200 having a housing 202, an RJ-45 network connector 204 and a power connector 206. The connector module 200 is shown disposed between the first seat 52 and second seat 54 connected beneath the second (middle) armrest 58.

It should be appreciated that while the several preferred embodiments are illustrated with various combinations of a power connector such as the 15 volt DC power connector 15 or the ARINC 628 power connector 20, and a network connector such as the RJ-45 network connector 16 or the universal serial bus connector 18, there can be several different combinations of these connectors disposed within the connector module of the present invention. The various preferred embodiments of the connector module of the present invention, and the ability to easily adapt the connector module for mounting adjacent various areas of a seat of mobile platform, thus allows users to easily connect their personal computing device to a control network on the mobile platform. The connector module of the present invention is unobtrusive and yet easily accessible by users, and does not require significant modifications to existing seat assemblies in mobile platforms such as aircraft.

The description of the invention is merely exemplary in nature and, thus, variations that do not depart from the gist of the invention are intended to be within the scope of the invention. Such variations, are not to be regarded as a departure from the spirit and scope of the invention.

What is claimed is:

1. A connector module adapted to be disposed into an interior compartment of a mobile platform, and integrated into a seat of the mobile platform for connecting a portable electronic device to a power source and an intranet located on-board the mobile platform, the connector module comprising:

a housing forming an integral portion of a seat of the mobile platform, wherein the seat comprises a seat cushion, a seat frame and a seat armrest;

wherein the housing comprises a base housing and a cable, and wherein the base housing is connected to the seat and the cable is connected between the base housing and the housing;

a networking port disposed in the housing adapted to couple the portable electronic device to the intranet for providing intranet connectivity of the portable electronic device wherein the intranet is on-board the mobile platform; and a power port disposed in the housing adapted to receive a DC power cable of the portable electronic device for providing power to the portable electronic device.

2. The connector module of claim 1 wherein the networking port comprises a Universal Serial Bus port.

3. The connector module of claim 1 wherein the networking port comprises a RJ-45 port.

4. The connector module of claim 1 wherein the power port comprises a 15 volt DC power connector.

5. The connector module of claim 1 wherein the power port comprises a multi-pin power connector.

6. The connector module of claim 1 wherein the power port and networking port are disposed in a common wall of the housing.

7. The connector module of claim 1 wherein the intranet is in communication with an internet.

8. A connector module disposed on a seat of a mobile platform for providing a plurality of connectivity options for connecting a portable electronic device to a power source and intranet located on-board the mobile platform, the connector module comprising:

a housing forming an integral portion of a seat within the mobile platform to be readily accessible by an occupant of said seat while said occupant is seated in said seat, wherein the seat comprises a seat cushion, a seat frame and a seat armrest;

wherein the housing comprises a base housing and a cable, and wherein the base housing is connected to the seat and the cable is connected between the base housing and the housing;

a first networking port comprising a Universal Serial Bus disposed in the housing adapted to couple the portable electronic device to the intranet for providing network connectivity of the portable electronic device, wherein the intranet is located on-board the mobile platform;

a second networking port comprising an RJ-45 port disposed in the housing adapted to couple the portable electronic device to the intranet for providing network connectivity of the portable electronic device; and a power port disposed in the housing adapted to receive a DC power cable of the portable electronic device for providing power to the portable electronic device.

9. The connector module of claim 8 wherein the intranet is in communication with an internet.

* * * * *